US007182055B1

(12) United States Patent
Hetzel et al.

(10) Patent No.: US 7,182,055 B1
(45) Date of Patent: Feb. 27, 2007

(54) REMOTE CAR STARTER SHIELDING APPARATUS

(76) Inventors: James G. Hetzel, 20 Birghtview Ave., Rutland, VT (US) 05701; Steven R. Ball, 11 Ave. B., Rutland, VT (US) 05701

( * ) Notice: Subject to any disclaimer, the term of this patent is extended or adjusted under 35 U.S.C. 154(b) by 0 days.

(21) Appl. No.: 11/474,536

(22) Filed: Jun. 27, 2006

(51) Int. Cl.

| | |
|---|---|
| ***F02N 17/00*** | (2006.01) |
| ***H04Q 1/04*** | (2006.01) |
| ***B65D 67/02*** | (2006.01) |
| ***B65D 85/38*** | (2006.01) |

(52) U.S. Cl. .................... 123/179.2; 206/37; 206/305; 341/176; 340/5.64

(58) Field of Classification Search ............ 123/179.2; 206/305, 320, 37.1, 37; 455/128; 340/5.64; 341/176
See application file for complete search history.

(56) References Cited

U.S. PATENT DOCUMENTS

| | | | | |
|---|---|---|---|---|
| 2,787,680 | A * | 4/1957 | Anderson | 200/61.79 |
| 2,856,477 | A * | 10/1958 | Schultz | 200/61.79 |
| 3,186,981 | A * | 6/1965 | De Ronde | 200/318 |
| 3,811,303 | A * | 5/1974 | Robertson | 70/237 |
| 4,068,109 | A * | 1/1978 | Hall | 200/332 |
| 4,604,605 | A * | 8/1986 | Meyers et al. | 341/34 |
| 5,021,616 | A * | 6/1991 | Hardt | 200/43.16 |
| 5,468,925 | A * | 11/1995 | Mohsen | 200/43.22 |
| D372,575 | S * | 8/1996 | Finn | D2/959 |
| D453,923 | S * | 2/2002 | Olson | D13/173 |
| 6,914,205 | B2 * | 7/2005 | Galea | 200/43.01 |
| 6,930,262 | B2 * | 8/2005 | Lee | 200/43.17 |
| 2002/0020614 | A1 * | 2/2002 | Bremner et al. | 200/43.22 |

FOREIGN PATENT DOCUMENTS

| | | | |
|---|---|---|---|
| EP | 412023 | A * | 2/1991 |

* cited by examiner

*Primary Examiner*—Stephen K. Cronin
*Assistant Examiner*—Arnold Castro
(74) *Attorney, Agent, or Firm*—John J. Welch, Jr., Esq.

(57) ABSTRACT

An improved remote car starter shielding apparatus consisting of a hard, durable, quadrangular convexly shaped shielding component with a plurality of holes in it near the top edge thereof through which a key-ring component, also affixable to a remote car starter unit through a hole in the car starter unit, is inserted and with an elongated elastic banding component, the ends of which are insertable through each of two laterally positioned holes in the shielding component and thereafter respectively affixed to respective remnant portions of the body of the elongated elastic banding component, serving to facilitate affixation of the shielding component about and above the frontal aspect of the remote car starter unit by way of the elastic banding component being fitted about the body of the remote car starter unit.

4 Claims, 6 Drawing Sheets

REMOTE CAR STARTER SHIELDING APPARATUS

CROSS REFERENCES TO PRIOR APPLICATIONS

There is a prior or parent applications to which the instant application may apply, to wit: a recently submitted application with application Ser. No. 11/385,809 in respect of a similar invention created by your inventors.

FEDERALLY SPONSORED RESEARCH AND DEVELOPMENT

There is no federally sponsored research and development to which the instant invention applies.

BACKGROUND OF THE INVENTION

1. Field of the Invention

The instant invention is one of those sorts of devices serving to prevent inadvertent activation of off/on switching units.

2. Relevant Art

The art disclosed in the herewith submitted Art Informational Statement does not anticipate the instant invention.

A SUMMARY OF THE INVENTION

1. A Brief Description of the Invention

The invention consists of a quadrangular convexly shaped shielding component. There are a plurality of holes near the top edge of the shielding component. A key-ring component which fits through any one of these holes is in turn also affixed to a remote car starter unit. There is a laterally positioned hole near each lateral edge of the shielding component. Positioned through each of these laterally positioned holes are the ends of an elongated elastic banding component with such ends thereof, once inserted through the laterally positioned holes; then being pressed against and affixed respectively to remnant portions of the body of such elastic banding. When the owner of such a remote car starter unit to which the invention is pivotably affixed via the key ring component wishes to shield the front side thereof so as to prevent inadvertent activation of the starter, the owner merely places the shielding component over the frontal aspect of the remote car starter unit and then circumscribes it with the elastic banding component to thereby hold the shielding component fast in place about the front side of the remote car starter unit. Removal of the banding from about the car starter unit allows for the invention to be pivotably removed from the frontal portion of the remote car starter unit so that buttons thereupon can then be activated.

2. Objects of the Invention

The invention serves to simply, conveniently, inexpensively and most dependably militate against any inadvertent actuation of a car starter button or a car door locking or unlocking button or a car trunk locking or unlocking button located on the front side of a remote car starter unit while the unit might, for example, be in the car owner's pocket.

A DESCRIPTION OF THE DRAWINGS

A DESCRIPTION OF THE PREFERRED EMBODIMENT

Figure 1:
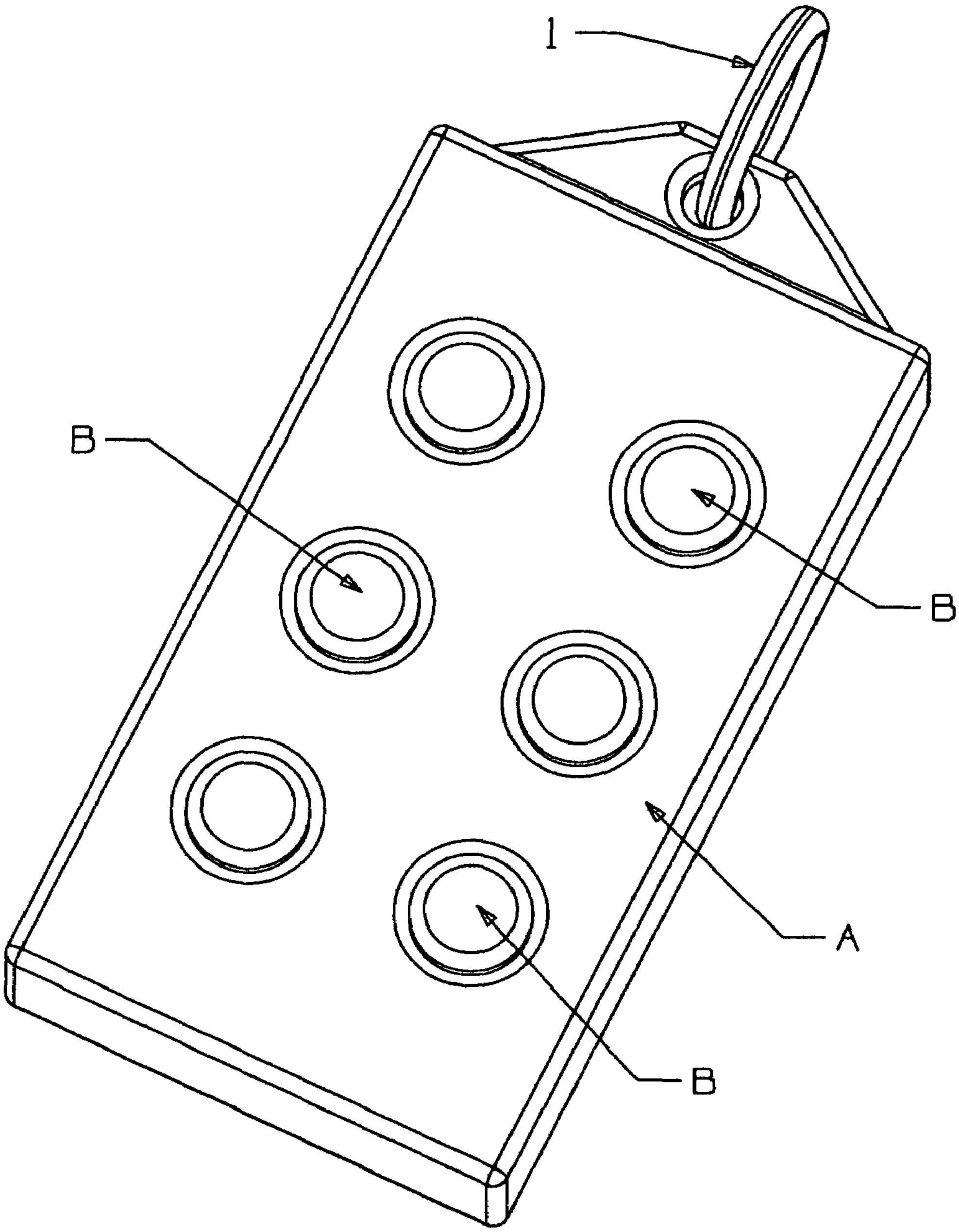
PRIOR ART FIG. 1
FIG. 1 is a depiction of a prototypical multi-button remote car starter.
Figure 2:
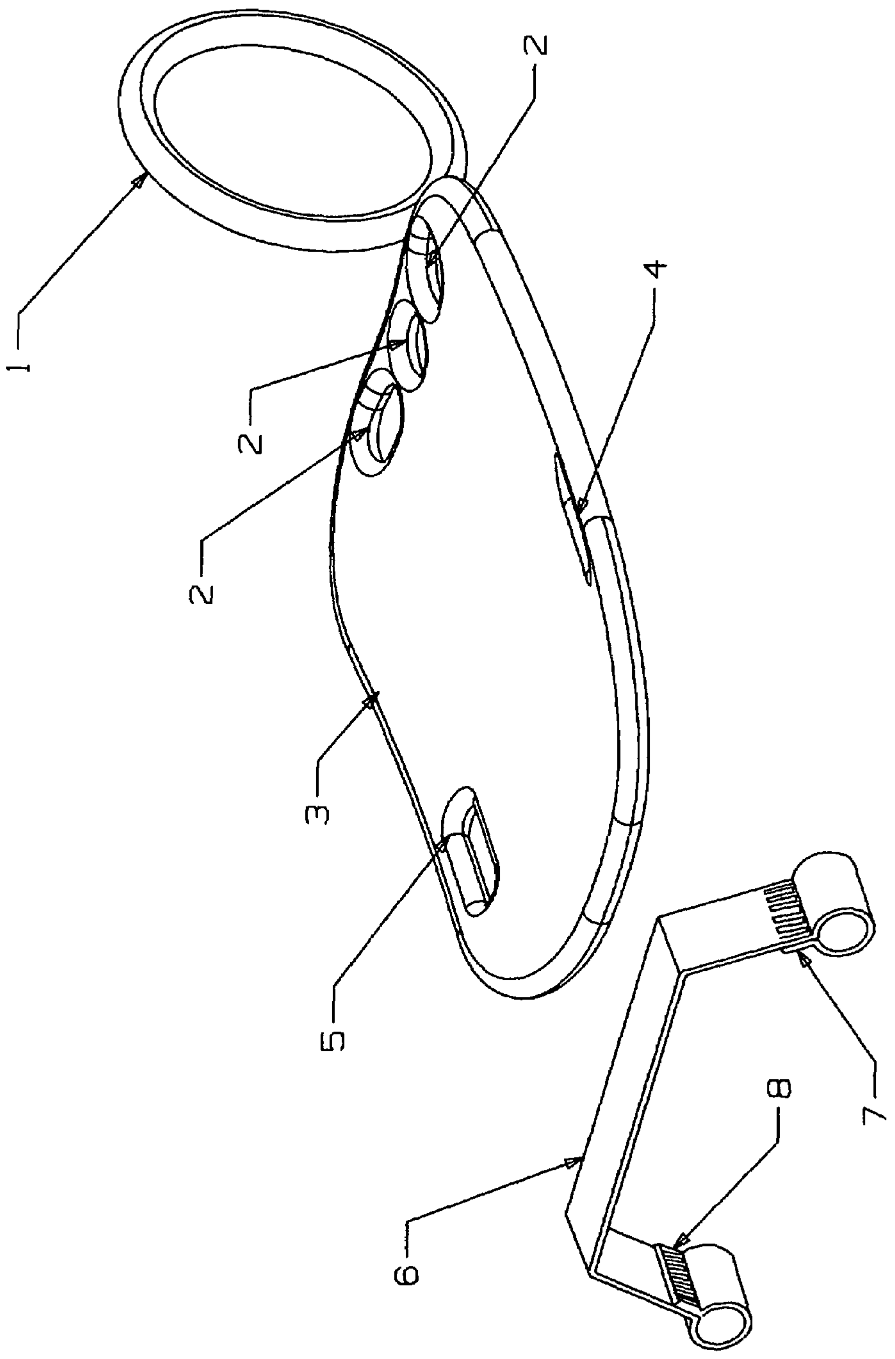
FIG. 2 is an exploded view of the component parts of the invention in apposition to one another.
Figure 3:
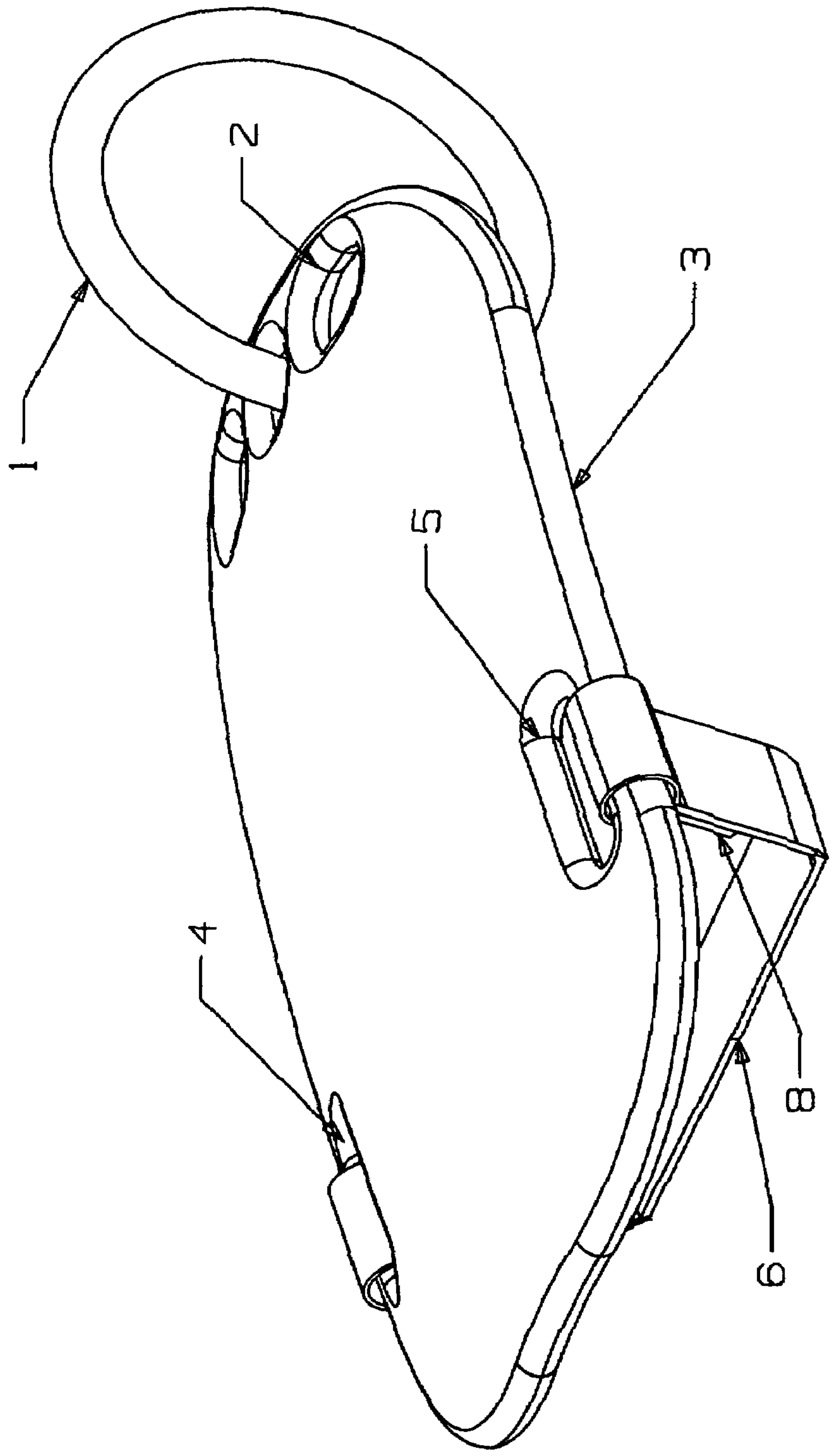
FIG. 3 is an isometric view of the intact instant invention.
Figure 4:
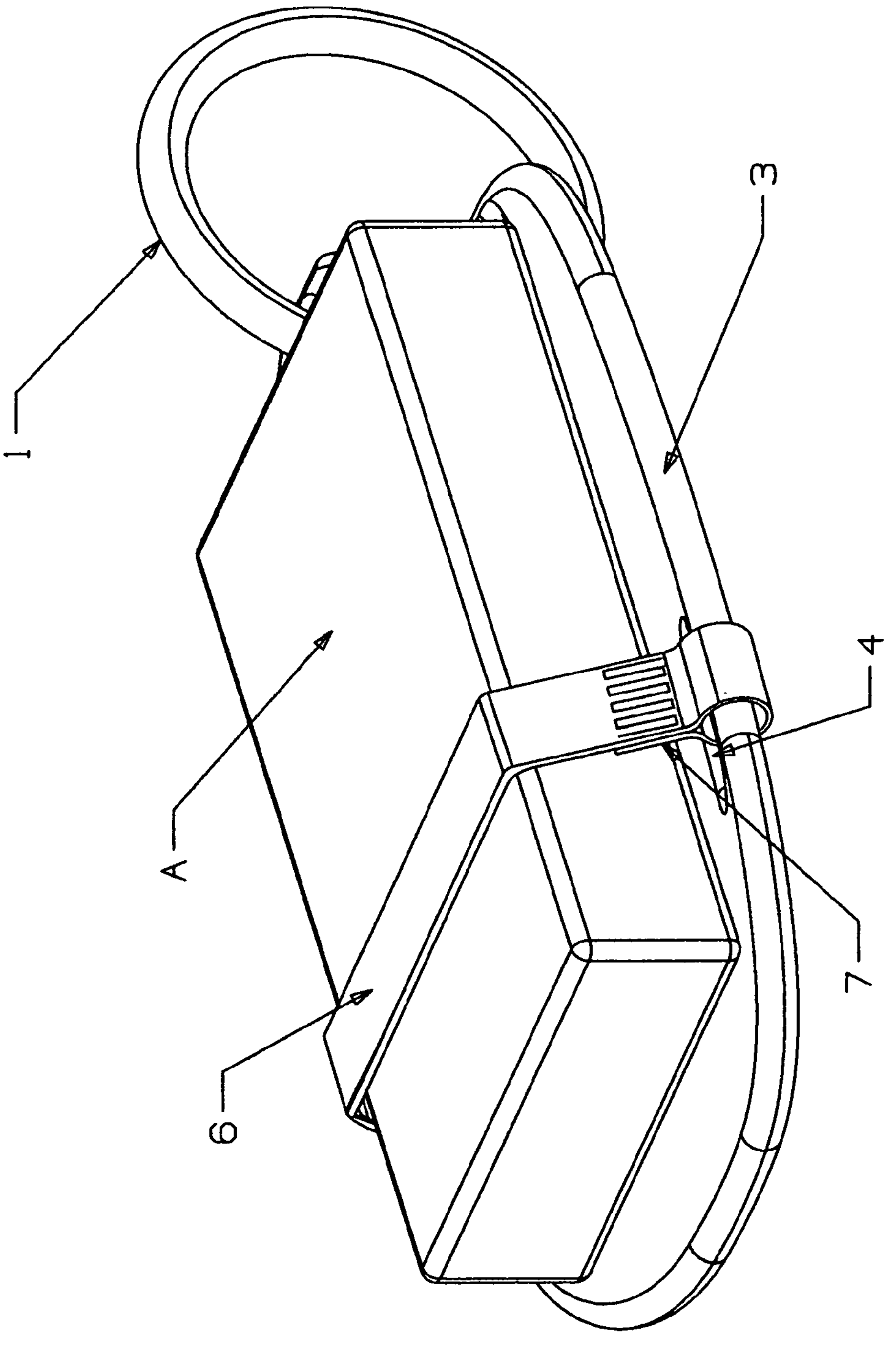
FIG. 4 is an isometric view of the instant invention shown affixed about a remote car starter unit.
Figure 5:
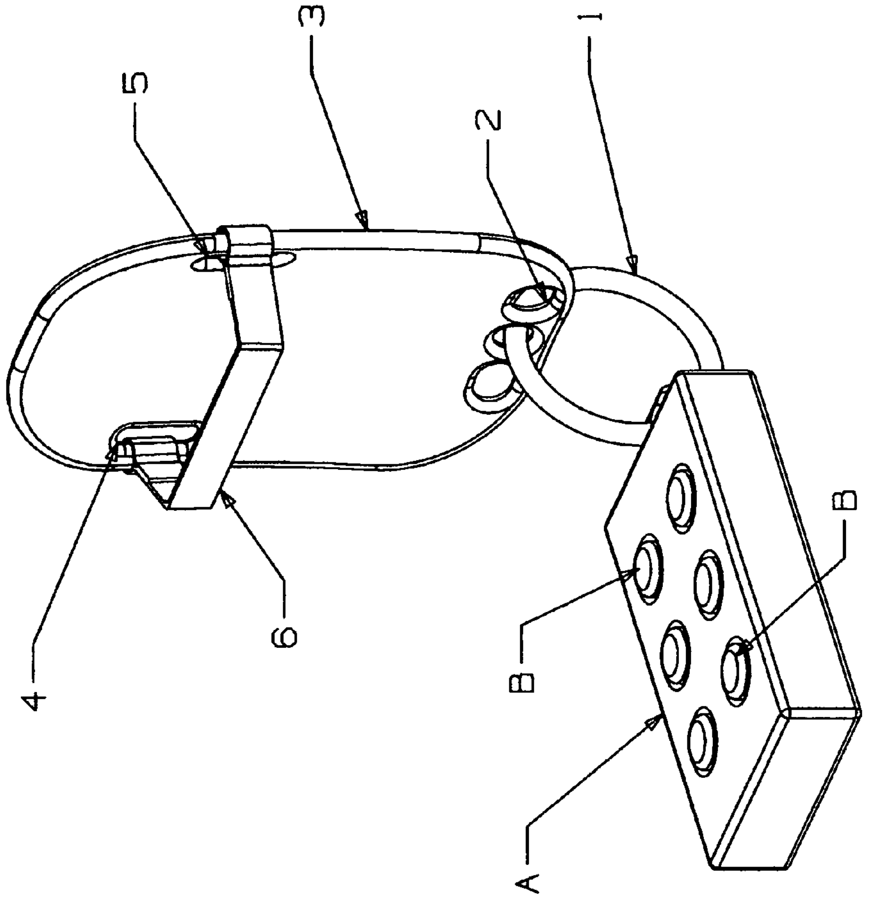
FIG. 5 is an isometric view of the instant invention pivotably affixed to a remote car starter unit.
Figure 6:
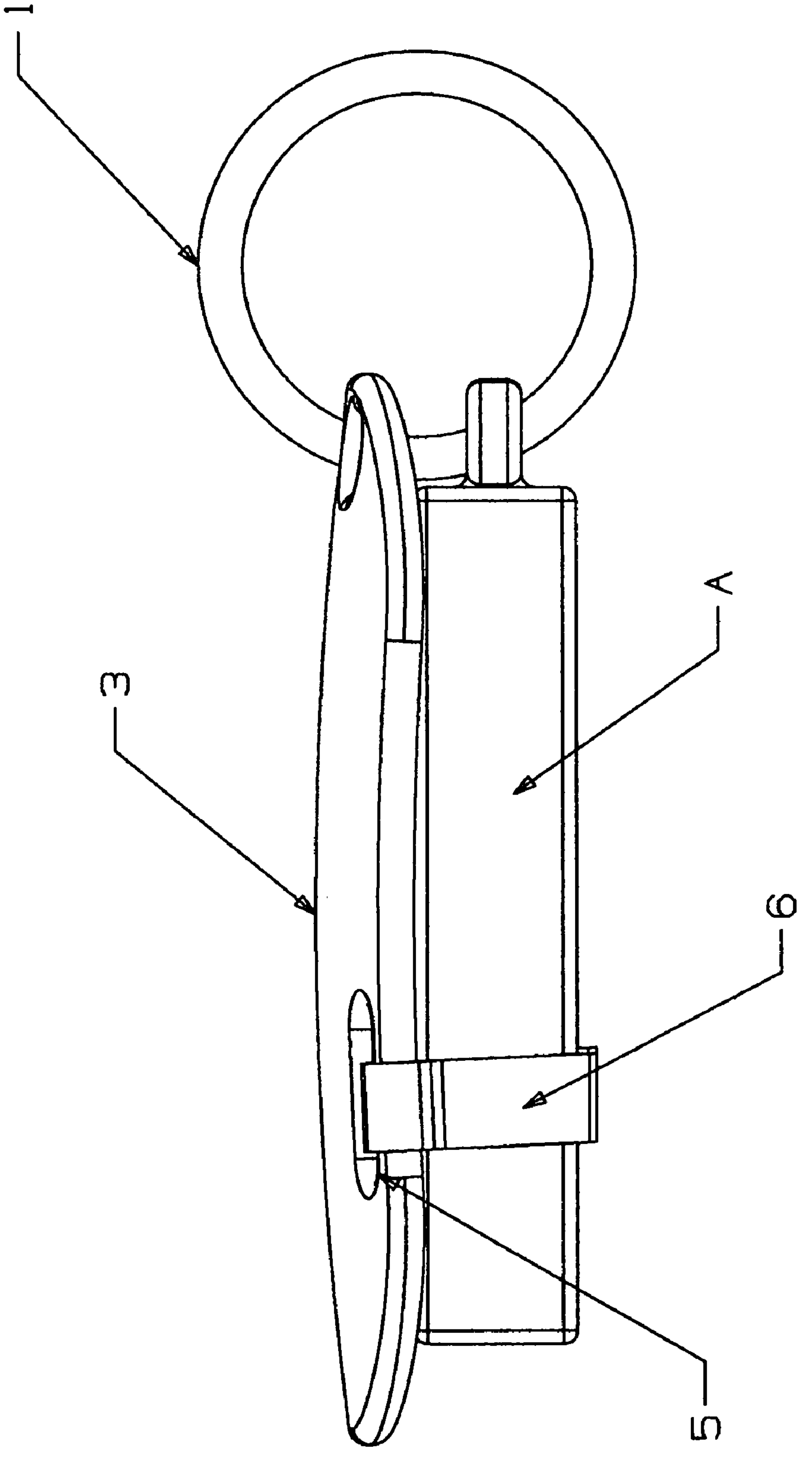
FIG. 6 is a lateral plan view of the instant invention shown affixed to a remote car starter unit.

FIG. 1 depicts a prototypical multi-button remote car starter unit A. FIG. 2 is an exploded view of the component parts of the invention. In FIG. 2 and in FIG. 4 there is to be seen key-ring component 1 which is found inserted through one of a plurality of holes 2 near the top edge of a quadrangular convexly shaped shielding component 3. A first laterally positioned through hole 4 and a second laterally positioned through hole 5 in shielding component 3 are seen as shown in FIG. 3. First and second end segments 7 and 8 respectively of elastic band component 6 as depicted in FIG. 2 are inserted through holes 4 and 5 respectively, then turned about and affixed to respective remnant portions of the body of elastic band component 6 as shown in FIG. 3 so that the body of elastic band component 6 then lies permanently below the bottom side of shielding component 3 as seen with reference to FIGS. 3 and 6. FIG. 5 depicts the fully assembled invention pivotably conjoined via its key-ring component 1 to starter unit A. FIG. 6 is a lateral plan view of the assembled invention affixed to remote car starter unit A with switching buttons B seen in FIGS. 1 and 5 that would serve to start a car; lock or unlock the doors of a car; lock or unlock the trunk of a car; and also activate a car alarm button. It should be noted that some remote car starter units A may be equipped with less than all of all of this panoply of switching buttons B to be found on the front side thereof. Remote car starter units A not shielded as shown in FIG. 6 are invariably subject to being inadvertently pressure actuated while in the pocket of an owner's clothing. The convex shape of shielding component 3 serves to completely prevent the inadvertent application of pressure to any of the switching buttons B of a starter unit A shielded, once again, as shown in FIG. 6 where any such inadvertent application of pressure would, for example, result in an inadvertent starting of a car. Such shielding is accomplished by simply slipping elastic band component 6 about the body of remote car starter unit A thereby holding shielding component 3 in place above and about the frontal aspect thereof and serving to militate against any such inadvertent actuation of any buttons B.

Respectfully submitted, in view of the relative ease of implementation of the invention as well as the inherent simplicity of the invention together with its unquestionable dependability as respects serving to prevent inadvertent actuation of any switching buttons on a remote car starter unit A, the invention is indeed not only new and unique but is unquestionably useful as well.

What is claimed is:

1. An improved remote car starter shielding apparatus, comprising:

a. a quadrangular, convexly shaped shielding component;

b. a plurality of through holes near a top edge of said quadrangular, convexly shaped shielding component;

c. a key-ring component inserted through one of said plurality of through holes and being affixable through a hole in a remote car starter unit to said remote car starter unit;

d. a first laterally positioned through hole in said shielding component;

e. a second laterally positioned through hole in said shielding component;

f. an elongated elastic banding component;

g. a first end of said elongated elastic banding component being insertable through said first laterally positioned hole and thereafter affixed to a body portion of said elongated piece of elastic banding, and;

h. a second end of said elongated piece of elastic banding being insertable through said second laterally positioned hole and thereafter affixed to a remnant body portion of said elongated piece of elastic banding.

2. The remote car starter shielding apparatus of claim 1 whereby said quadrangular, convexly shaped shielding component is made of a durable, hard plastic material.

3. The remote car starter shielding apparatus of claim 1 whereby said quadrangular, convexly shaped shielding component is made of a durable, hard wood material.

4. The remote car starter shielding apparatus of claim 1 whereby said quadrangular, convexly shaped shielding component is made of a durable, hard metal material.

* * * * *